United States Patent Office 3,565,959
Patented Feb. 23, 1971

3,565,959
PROCESS FOR OXIDIZING MERCAPTANS TO DISULFIDES
Sinji Takase, Yokohama-shi, Masao Nambu, Kawasaki-shi, Harumichi Watanabe, Zushi-shi, and Tomonori Shioiri, Kawasaki-shi, Japan, assignors to Nippon Oil Company, Limited, Tokyo, Japan
No Drawing. Filed May 24, 1968, Ser. No. 731,717
Int. Cl. B01j *11/22;* C07c *149/12;* C10g *27/04*
U.S. Cl. 260—608                                        7 Claims

ABSTRACT OF THE DISCLOSURE

A process for oxidizing mercaptans having harmful properties and malodors to facilitate removal thereof by converting them into disulfides by oxidation thereof which comprises bringing mercaptans into contact with an oxidizing agent such as oxygen or oxygen-containing gases in the presence of a poly metalo-phthalocyanine compound obtained by reacting at least a metal salt of metals of iron, copper, cobalt, nickel, chromium, manganese, zinc, vanadium and molybdenum with pyromellitonitrile, or, a mixture of urea and any one of pyromellitic anhydride, pyromellitic acid or pyromellitic acid imide.

BACKGROUND OF THE INVENTION

(1) Field of the invention

This invention relates to a novel process for oxidizing mercaptans to convert the same into disulfides.

(2) Description of the prior art

In general, liquefied petroleum gas, straight run gasoline, naphtha, kerosene, gas oil and other petroleum fractions obtained by distillation of a crude oil; cracked gasoline, cracked gas oil and other fractions obtained by thermal or catalytic cracking, and the products of other cracking processes such as coking of a crude oil, always contain some mercaptans.

It is known well that these mercaptans have harmful properties such as corrosiveness, and are malodorous.

Hence, in order to eliminate these mercaptans having harmful properties, there have been proposed heretofore various processes for removing mercaptans by extraction with an aqueous alkaline solution, or by converting mercaptans into disulfides by oxidation thereof, or, a process in which the above-mentioned extraction and oxidation are combined together.

In the extraction of mercaptans with an aqueous alkaline solution, an aqueous solution of sodium hydroxide or potassium hydroxide is used. However, for the purpose of increasing the solubility of mercaptans in the aqueous alkaline solution, an aqueous solution containing alcohol, phenol, cresol or organic acid as a solutizer may also be used. Anyhow, in order to practise this process economically, the aqueous alkaline solution used for the extraction must be regenerated and recovered for reuse.

In this instance, in general, a regenerating process in which mercaptans contained in the aqueous alkaline solution are oxidized to disulfides has been adopted, since these disulfides are scarcely soluble in aqueous alkaline solution and thus they can be easily separated and removed therefrom.

Heretofore, as a catalyst for converting mercaptans into disulfides by oxidation thereof, a solution of sodium plumbate, copper chloride, lead sulfide, tannin, cobalt phthalocyanine, gallic acid, substituted-phenols, substituted-anilines, N,N-disalicylidene ethylenediamine cobalt, sulfur dyes or potassium ferrocyanide have been used. However, none of these catalysts are satisfactory with regard to catalyst life and catalytic activities.

SUMMARY OF THE INVENTION

An object of this invention is to provide a novel catalyst which may be used successfully in an oxidation reaction for converting mercaptans into disulfides, free from drawbacks accompanied by the conventional catalysts known heretofore.

This invention has its basis on a novel finding in that poly metalo-phthalocyanines show exceptionally superior catalytic activities and life in the reaction for converting mercaptans into disulfides by oxidation thereof over any of those known catalysts.

The poly metalo-phthalocyanines referred to herein are compounds having many tetraazaporphine rings coordinated with metals obtained by heating one or more metal salts with pyromellitonitrile or a mixture of urea and a member selected from pyromellitic anhydride, pyromellitic acid and pyromellitic acid imide.

For the sake of distinguishing those obtained by reaction of only one metal salt from those obtained by reaction of two or more metal salts, the latter may be specifically referred to as poly polymetalo-phthalocyanines herein.

The poly metalo-phthalocyanines used in the process of this invention may be synthesized by various processes, for example, as described in Journal of the Chemical Physics, vol. 32, p. 324 (1960); Journal of the American Chemical Society, vol. 81, p. 4795 (1959) and Journal of the Chemical Industry (Japan), vol. 67, p. 1600 (1964).

In addition, the poly metalo-phthalocyanines obtained in a modified process in which phthalic acid, phthalic anhydride, phthalimide or phthalonitrile is added to active terminals of poly metalo-phthalocyanines with subsequent termination of growth as disclosed in Journal of the American Chemical Society, vol. 80, p. 1197 (1958), may also be used conveniently in the process of this invention.

Examples of poly metalo-phthalocyanines useful in the process of this invention include poly iron-phthalocyanine, poly cobalt-phthalocyanine, poly copper-phthalocyanine, poly manganese-phthalocyanine, poly vanadium-phthalocyanine, poly zinc-phthalocyanine, poly nickel-phthalocyanine, and poly molybdenum-phthalocyanine.

In addition, such compounds as poly mercury-phthalocyanine, poly platinum-phthalocyanine, poly silver-phthalocyanine, poly palladium-phthalocyanine, poly chromium-phthalocyanine, poly bismuth-phthalocyanine, poly tin-phthalocyanine, poly lead-phthalocyanine, poly thorium-phthalocyanine, poly magnesium-phthalocyanine, poly hafnium-phthalocyanine and poly zirconium-phthalocyanine also have catalytic activities.

Among these poly metalo-phthalocyanines are most preferable in this invention, poly iron-phthalocyanine, poly cobalt-phthalocyanine, poly copper-phthalocyanine and poly molybdenum-phthalocyanine.

Moreover, poly polymertalo-phthalocyanines in which two or more metals such as copper, manganese, iron, cobalt, vanadium, zinc, nickel and molybdenum are combined together optionally, for example, poly iron-cobalt-phthalocyanine, poly copper-manganese-phthalocyanine, poly cobalt-molybdenum-phthalocyanine, poly cobalt-copper-iron-phthalocyanine, poly cobalt-nickel-maganese-phthalocyanine and the like are useful in the process of this invention as well.

The catalytic activities of these poly metalo-phthalocyanines vary somewhat depending upon the type of metal used and the temperature at which these compounds are prepared. For example, metals such as copper, iron, manganese, vanadium, zinc, nickel and molybdenum afford an excellent catalytic activity, and when a high reaction temperature, e.g. above 200° C., is used in the preparation of these compounds, there is produced a poly metalo-phthalocyanine having a higher degree of polymerization, e.g. 6–7, as compared with the use of a reaction temperature of 160–180° C. which gives those having a degree of polymerization ranging from 2 to 3, and the catalytic activity per unit weight of a poly metalo-phthalocyanine having higher degree of polymerization may be enhanced somewhat.

In general, when using these poly metalo-phthalocyanines as a catalyst for oxidizing mercaptans in the process of this invention, they may be used in the forms of an aqueous alkaline solution or a suspension.

However, if a fixed bed process is preferable, these poly metalo-phthalocyanines may be used by shaping into catalyst particles or by supporting the catalyst on a solid carrier.

Carriers which may be used in the process of this invention include, for example, active carbon, alumina, bauxite, iron oxide, activated clay, acidic clay, zeolite, molecular sieve and silica gel.

The modes of oxidation of mercaptans in the process of this invention will be explained in the following:

The process of this invention may be applied to all of aqueous alkaline solutions containing mercaptans, or various hydrocarbon mixtures containing the same.

For instance, a waste aqueous sodium hydroxide formed at the time of washing various petroleum fractions with sodium hydroxide in the refining process may be brought into contact with the poly metalo-phthalocyanines and an oxidizing agent to regenerate the waste aqueous sodium hydroxide by oxidizing mercaptans contained therein to disulfides and removing the resulting insoluble disulfides therefrom.

Also, an aqueous alkaline solution used for the extraction of mercaptans contained in hydrocarbons may be brought into contact with the poly metalo-phthalocyanines and an oxidizing agent thereby oxidizing mercaptans to disulfides and removing the same therefrom, and the aqueous alkaline solution thus regenerated as such may be reused for the extraction of mercaptans, without particularly separating the poly metalo-phthalocyanines therefrom.

Furthermore, the process of this invention may be carried out in a mode in which hydrocarbons are brought into contact with the poly metalo-phthalocyanines and an oxidizing. In this case, however, the presence of an aqueous alkaline solution is preferable since the rate of oxidation reaction is slow otherwise.

Thus, the process of this invention can be carried out by bringing hydrocarbons into contact with an aqueous alkaline solution, a poly metalo-phthalocyanine and an oxidizing agent at the same time.

In the process of this invention, oxygen is used effectively as an oxidizing agent and an oxygen-containing gas such as air may also be used. These oxidizing agents may be bubbled into a liquid phase, or contacted therewith by mechanical agitation.

The amount of catalyst used in the process of this invention varies depending upon the type of mercaptans to be oxidized and reaction conditions such as the concentration of mercaptans, the temperature at which the oxidation reaction is carried out, etc.

However, for example, 0.001–20% by weight of a poly metalo-phthalocyanine suspended in a mercaptan-containing aqueous alkaline solution, or a homogeneous aqueous alkaline solution containing 0.001–0.2% by weight of a poly metalo-phthalocyanine which is made soluble in an aqueous alkaline solution by merely boiling the same in an aqueous solution such as aqueous sodium hydroxide or aqueous potassium hydroxide, may be used as a catalyst.

In practising the process of this invention, the reaction temperature is preferably from 0° C. to 100° C., and the reaction pressure is preferably from normal pressure to 30 atmospheres.

The outstanding effects of the present invention and the accompanying advantages will be described fully in the following to illustrate superiority of the process of this invention over any of the prior art processes known heretofore.

As described above, the catalyst used in the process of this invention is superior to those known heretofore in that it has exceptionally long life of catalyst capable of enduring a prolonged period of use and that it exhibits an excellent catalytic activity.

For example, even in cobalt-phthalocyanine and cobalt-phthalocyanine into which sulfonate groups are introduced to give a hydrophilic group, which have been believed to have particularly excellent catalytic activities and lives of catalyst among catalysts for oxidizing mercaptans known heretofore, the catalytic activities are drastically decreased in a prolonged period of use and eventually deactivated, allowing no regeneration.

In contradistinction, in the poly metalo-phthalocyanines and those made soluble in an aqueous alkaline solution by a simple treatment with alkali used in the process of this invention, no such disadvantages is observed at all.

For instance, when a catalytically cracked gasoline containing 200 p.p.m. of mercaptan sulfur is treated continuously using a liter of a 2 N aqueous sodium hydroxide containing 100 p.p.m. of cobalt-phthalocyanine disulfonate, initially the residual amount of mercaptan sulfur in the gasoline is decreased as low as 4 p.p.m. However, when the total treating amount reaches 1000 l., the catalytic activity of catalyst is decreased causing increase in the residual amount of mercaptan sulfur in the treating gasoline as high as 25 p.p.m., and after an additional treatment of another 1000 l., the catalyst is almost completely deactivated.

The mercaptan sulfur content referred to herein means a quantitative value as determined by an amperometric titration method according to ASTM D1323–62.

In clear contrast, when the same treatment as described above is carried out using a 2 N aqueous sodium hydroxide containing 100 p.p.m. of poly cobalt-phthalocyanine with alkali treatment of this invention, no important decrease in the catalytic activity is observed even after the treating amount of the catalytically cracked gasoline reaches 3000.1. and the residual amount of mercaptan sulfur in the treated gasoline remains as low a 3 p.p.m.

One of the outstanding features of poly methalo-phthalocyanine catalyst of this invention resides is that it may readily be made soluble in an aqueous alkaline solution or water by way of a simple treatment of boiling the same in an aqueous alkaline solution, and it may be used as a homogeneous aqueous alkaline solution catalyst.

Because of the fact that poly metalo-phthalocyanines of this invention possess acid anhydride structure, acid imide structure, acid amide structure, carboxylic or nitrile group at the active terminals thereof, these active terminal groups of poly metalo-phthalocyanines are turned into a structure like that of sodium salt of carboxylic acid, consuming sodium hydroxide in an amount corresponding to one third by weight thereof.

In accordance with this basic property, to a part by weight of poly metalo-phthalocyanine are added 0.3 part by weight of sodium hydroxide powder and 4 parts by weight of water and the resulting mixture is heated under reflux for 5 hours, then, water is evaporated to give a solid. The resulting solid powder is soluble in water or an aqueous sodium hydroxide nearly 100% and the solubility therein is as high as 4000 p.p.m.

As described above, these poly metalo-phthalocyanines of this invention have not only surprisingly prolonged lives of catalyst but also excellent catalytic activities. In addition, these poly metalo-phthalocyanines have an advantage in that they may readily be made soluble in water and an aqueous alkaline solution by merely boiling the same in an aqueous alkaline solution and may be used as a homogeneous aqueous alkaline solution catalyst.

These advantages are not found in the known catalysts falling within the scope of metalo-phthalocyanine compounds such as cobalt-phthalocyanine, but only in the poly metalo-phthalocyanines of this invention.

DESCRIPTION OF THE PREFERRED EMBODIMENTS

The following examples will serve to illustrate this invention more fully and practically. It should not be construed, however, that these examples restrict this invention as they are given merely by way of illustration:

EXAMPLE 1

Preparation of catalyst (1)

To an autoclave were charged 2 mols of pyromellitonitrile, 1 mol of cuprous chloride and 0.4 mol of urea and the resulting mixture was maintained at 200° C. for 2 hours under a pressure of 70 atmospheres under a nitrogen atmosphere.

The reaction product was washed with boiling water, then, repeatedly washed with 18% hydrochloric acid under boiling to remove unreacted matters therefrom, dried and dissolved in 5 l. of a concentrated sulfuric acid. The resulting sulfuric acid solution is added dropwise to 40 l. water and a precipitate obtained was washed with water. Subsequent drying at 400° C. for 5 hours under a reduced pressure of 1 mm. Hg to remove small amounts of sublimatable impurities gave poly copper-phthalocyanine in a yield corresponding to 60% of theoretical yield.

The result of an elementary analysis of the product revealed that the composition thereof corresponds to $(C_{20}H_4N_3Cu)_n$ and by determining nitrile group at an active terminal, the average degree of polymerization was found to be 5–6.

A compound having a similar composition was obtained by using cupric chloride $(CuCl_2 \cdot 2H_2O)$ in place of cuprous chloride. Similarly, when the reaction was carried out by substituting suitable amounts of chlorides, nitrates, acetates or sulfates of iron, nickel, chromium, manganese, cobalt, zinc, vanadium and molybdenum for cuprous chloride, there were obtained correspondingly poly iron - phthalocyanine, poly nickel - phthalocyanine, poly chromium-phthalocyanine, poly manganese-phthalocyanine, poly cobalt-phthalocyanine, poly zinc-phthalocyanine, poly vanadium-phthalocyanine and poly molybdenum-phthalocyanine, respectively, in the yields corresponding to 20–60% of theoretical yields.

Preparation of catalyst (2)

To an autoclave were charged 2 mols of pyromellitic acid, 20 mols of urea, 0.5 mol of cuprous chloride and 0.5 mol of ammonium molybdate and the resulting mixture was maintained at 160 C. for 2 hours under normal pressure and under a nitrogen atmosphere.

By following the same procedures as described in the above preparation of catalyst (1) thereafter, there was obtained poly copper-molybdenum-phthalocyanine in a yield corresponding to 50% of theoretical yields.

Various poly binary-metalo-phthalocyanines were obtained by substituting two kinds of metal salts selected from chlorides, nitrates and acetates of iron, nickel, manganese, cobalt, zinc and vanadium for the above-mentioned cuprous chloride-ammonium molybdate system.

The active terminals of these poly metalo-phthalocyanines thus obtained have carboxylic, nitrile, acid imide, acid amide or acid anhydride groups and quantitative determinations of these terminal groups revealed that these poly metalo-phthalocyanine have structures corresponding to dimers or trimmers of metalo-phthalocyanines.

It was confirmed that the same reaction takes place even when pyromellitic anhydride was substituted for pyromellitic acid.

PREPARATION OF CATALYST (3)

To 30 g. of poly copper-phthalocyanine obtained in the preparation (1) described above were added 10 g. of sodium hydroxide and 120 ml. of water and the resulting mixture was heated under reflux for 5 hours, then, water was evaporated to afford 39 g. of a solid powder catalyst.

To 1 N aqueous sodium hydroxide in an amount of between 10 l. and 400 l. was added the powder obtained above and the resulting solution was agitated and allowed to stand still overnight. Filtration of the solution gave a homogeneous catalyst solution containng 100–3000 p.p.m. of poly copper-phthalocyanine.

By subjecting poly metalo-phthalocyanines obtained according to procedures as described in the above-mentioned preparation (1) or (2) to a heat treatment with an alkali, there were obtained solid powder catalysts soluble in an aqueous alkaline solution.

Oxidation of mercaptans

To a 200 ml. capacity conical flask were charged 10 ml. of a 1 N aqueous sodium hydroxide containing 200 p.p.m. of a powdered catalyst obtained according to any of the preparation (1), (2) or (3) described above, and 20 ml. of a hydrocarbon solution of mercaptans and, after the flask was sealed, the mixture was maintained at 27° C. and agitated for 10 minutes.

Then the reaction mixture was neutralized with 5 N aqueous hydrochloric acid and shaken well to transfer mercaptans remaining in sodium hydroxide phase into hydrocarbon phase.

The results of quantitative determination of mercaptan sulfur content in hydrocarbon phase before and after the reaction are shown in the following Table 1:

show even higher activities. Particularly, the homogeneous catalyst solutions obtained according to the prepa-

TABLE 1.—OXIDATION OF MERCAPTANS

| Experiment Nos. | Catalyst | Preparation of catalyst | Mercaptan solution Mercaptan | Mercaptan solution Solvent | Mercaptan sulfur content, p.p.m. Before treatment | Mercaptan sulfur content, p.p.m. After treatment | Reaction temperature, ° C. |
|---|---|---|---|---|---|---|---|
| 1 | None | | n-Butyl | n-Heptane | 501 | 493 | 27 |
| 2 | Poly copper-phthalocyanine | (1) | do | do | 501 | 0 | 27 |
| 3 | Poly cobalt-phthalocyanine | (1) | do | do | 501 | 0 | 27 |
| 4 | Poly iron-phthalocyanine | (1) | do | do | 501 | 7 | 27 |
| 5 | Poly manganase-phthalocyanine | (1) | do | do | 501 | 4 | 27 |
| 6 | Poly nickel-phthalocyanine | (1) | do | do | 501 | 3 | 27 |
| 7 | Poly vanadium-phthalocyanine | (1) | do | do | 513 | 9 | 27 |
| 8 | Poly zinc-phthalocyanine | (1) | do | do | 513 | 11 | 27 |
| 9 | Poly molybdenum-phthalocyanine | (1) | do | do | 513 | 31 | 27 |
| 10 | Poly cobalt,molybdenum-phthalocyanine | (2) | do | do | 513 | 0 | 27 |
| 11 | Poly copper-cobalt-phthalocyanine | (2) | do | do | 513 | 0 | 27 |
| 12 | Poly cobalt-nickel-phthalocyanine | (2) | do | do | 513 | 0 | 27 |
| 13 | Poly iron-molybdenum-phthalocyanine | (2) | do | do | 513 | 8 | 27 |
| 14 | Poly iron-manganese-phthalocyanine | (2) | do | do | 504 | 19 | 27 |
| 15 | Poly vanadium-nickel-phthalocyanine | (2) | do | do | 504 | 28 | 27 |
| 16 | Poly zinc-molybdenum-phthalocyanine | (2) | do | do | 504 | 14 | 27 |
| 17 | Poly copper-phthalocyanine | (3) | do | do | 491 | 0 | 27 |
| 18 | Poly cobalt-phthalocyanine | (3) | do | do | 491 | 0 | 27 |
| 19 | Poly iron-phthalocyanine | (3) | do | do | 491 | 0 | 27 |
| 20 | Poly cobalt phthalocyanine | (1) | Thiophenol | do | 404 | 9 | 27 |
| 21 | do | (1) | n-Amyl | do | 396 | 2 | 27 |
| 22 | do | (1) | t-Butyl | do | 504 | 11 | 27 |
| 23 | do | (1) | n-Hexy | do | 497 | 11 | 27 |
| 24 | Poly copper-phthalocyanine | (1) | Dodecyl | do | 508 | 58 | 27 |
| 25 | do | (1) | do | Isooctane | 508 | 61 | 27 |
| 26 | do | (1) | n-Butyl | Benzene | 518 | 0 | 27 |
| 27 | do | (1) | do | Toluene | 518 | 0 | 27 |
| 28 | Poly cobalt-phthalocyanine | (1) | Straight run sour gasoline a | | 218 | 14 | 27 |
| 29 | do | (1) | Catalytically cracked gasoline b | | 311 | 7 | 27 |
| 30 | do | (1) | Straight run sour kerosene c | | 370 | 29 | 27 |
| 31 | do | (1) | Straight run sour gas oil d | | 448 | 71 | 27 |
| 32 | Poly cobalt-molybdenum-phthalocyanine | (1) | Straight run sour gasoline a | | 218 | 18 | 27 | a Light gasoline fraction obtained by distilling Khursaniyah Crude, IBP 29° C., EP 155° C., Specific gravity d⁴¹⁵ 0.681.
b Cracked gasoline fraction obtained by fluidized-bed catalytic cracking of a gas oil obtained from Khursaniyah Crude by distillation, IBP 29° C., EP 210° C., Specific gravity d⁴¹⁵ 0.730.
c Kerosene fraction obtained by distilling Khursaniyah Crude, IBP 165° C., EP 253° C., Specific gravity d⁴¹⁵ 0.791.
d Gas oil fraction obtained by distilling Khursaniyah Crude, IBP 198° C., EP 333° C. Specific gravity d⁴¹⁵ 0.837.

EXAMPLE 2

To a 300 ml. capacity conical flask were charged 100 ml. of suspension or solution of catalysts in 1 N aqueous sodium hydroxide referred to in Example 1 prepared according to the preparation (1), (2) or (3) and, after air in the flask was completely replaced by oxygen, the flask was connected with a gas burrett containing oxygen gas and the oxidation reaction was carried out while maintaining the temperature at 27° C. with agitation at a constant speed to measure the rate of absorption of oxygen in the oxidation reaction.

The comparison of the results obtained with those of oxygen absorption test performed under the same conditions but using typical catalysts known heretofore is shown in the following Table 2:

TABLE 2

| Experiment Nos. | Type and concentration of catalyst used | Preparation of catalyst | Time¹ (min.) |
|---|---|---|---|
| 1 | Cobalt-phthalocyanine (0.2 wt. percent) | | 10 |
| 2 | Copper-phthalocyanine (0.2 wt. percent) | | 19 |
| 3 | Potassium ferrocyanide (0.2 wt. percent) | | 49 |
| 4 | Tannin (0.2 wt. percent) | | 56 |
| 5 | Poly copper-phthalocyanine (0.2 wt. percent) | (1) | 8 |
| 6 | Poly cobalt-phthalocyanine (0.2 wt. percent) | (2) | 7 |
| 7 | Poly cobalt-molybdenum-phthalocyanine (0.2 wt. percent) | (2) | 8 |
| 8 | Poly cobalt-phthalocyanine (0.2 wt. percent) | (3) | 4 |
| 9 | Poly cobalt-phthalocyanine (0.1 wt. percent) | (3) | 2 |
| 10 | Poly copper-phthalocyanine (0.1 wt. percent) | (3) | 2 |

¹ Required for absorbing necessary oxygen for oxidizing 90% of n-butyl-mercaptan added.

As can be clearly noted from Table 2, although metalo-phthalocyanine such as cobalt-phthalocyanine has a relatively high catalytic activity among the conventionally known catalysts, polymetalo-phthalocyanines obtained according to the preparations (1) and (2) of this invention ration (3) show remarkably high activities with the concentration of 0.02–0.1 weight percent.

As shown above, it is noted that a homogeneous catalyst solution of a concentration of only about 0.02 weight percent has an outstandingly high catalytic activity as compared with 0.2 weight percent suspension catalyst.

However, cobalt-phthalocyanine or copper-phthalocyanine conventionally known heretofore cannot be made soluble in an aqueous alkaline solution by a simple treatment with an alkali, unlike poly metalo-phthalocyanines of this invention. Hence, in order to necessarily use the same as a homogeneous catalyst solution, there must be followed separately the procedures of introducing hydrophilic substituent thereinto.

It is crystal clear that poly metalo-phthalocyanines of this invention are far superior in this regard over the known catalysts.

EXAMPLE 3

To a 2 liter-capacity reactor provided with an agitator was charged 1 liter of 2 N aqueous soduim hydroxide containing 1 g. of poly copper-phthalocyanine obtained according to the preparation (3) and the solution was agitated at a constant speed. Then, a sour gasoline having an initial boiling point of 29° C., and end point of 155° C., a specific gravity of 0.681 (15/4° C.) and a mercaptan sulfur content of 218 p.p.m. obtained by fractionating Khursaniyah Crude was continuously passed therethrough at a rate of 900 ml./hr. at normal temperature.

In the meantime, air was blown thereinto from capillaries provided at the bottom of the reactor at a rate of 250 ml./hr.

The residual mercaptan content in the effluent gasoline discharged continuously from the reactor was determined quantitatively as 5 p.p.m.

Even after thus treating a total of 270 1. of sour gasoline over a period of 300 hours, the mercaptan content in the effluent gasoline remained in the range of 4–5 p.p.m., and no important change in the catalytic activity was observed.

EXAMPLE 4

To 1 liter of 1 N aqueous sodium hydroxide containing 1 g. of poly cobalt-phthalocyanine obtained according to the preparation (3) was gradually added 100 g. of granulated active carbon (average particle size 0.3 cm.) with agitation and the mixture was allowed to stand for 2 hours.

To an upright glass tube having an inner diameter of 2 cm. and a height of 150 cm. was packed the catalyst supported on an active carbon carrier obtained in the above together with 400 ml. of 2 N aqueous sodium hydroxide.

Then, a sour gasoline having an initial boiling point of 29° C., an end point of 155° C., a specific gravity of 0.681 (15/4° C.) and a mercaptan content of 218 p.p.m. obtained by fractionating Khursaniyah Crude was passed through the reactor tube from the bottom thereof at a rate of 3 l./hr. at normal temperature.

Air required for the oxidation reaction was blown into the liquid flowing therethrough from capillaries provided at the bottom of the reactor tube at a rate of 450 ml./hr.

The residual mercaptan content in thus treated gasoline was determined quantitatively as 7 p.p.m.

What is claimed is:

1. A process for oxidizing mercaptans to disulfides which comprises oxidizing mercaptans with an oxidizing agent selected from the group consisting of oxygen and oxygen-containing gases in the presence of a member selected from the group consisting of poly iron-phthalocyanine, poly cobalt-phthalocyanine, poly copper-phthalocyanine, and poly molybdenum-phthalocyanine, said member containing a plurality of tetraazoporphine rings co-ordinated with the respective above mentioned metal.

2. A process according to claim 1 wherein said catalyst is used in a form selected from the group consisting of a suspension in an alkali solution, a solution in an alkaline solution, shaped catalyst and catalyst supported on a carrier.

3. A process according to claim 1 wherein said catalyst is used in an amount of 0.001–20% by weight based on the weight of alkaline solution containing mercaptans.

4. A process according to claim 1 wherein said catalyst is a poly metalo-phthalocyanine having a degree of polymerization of 6–7.

5. A process according to claim 1 wherein said oxidation of mercaptans is carried out by extracting mercaptans contained in hydrocarbons with an aqueous alkaline solution, bringing said aqueous alkaline solution into contact with said catalyst and oxidizing agent as defined in claim 1, removing the resulting disulfides therefrom and recycling thus regenerated alkaline solution for reuse.

6. A process according to claim 1 wherein said oxidation of mercaptans is carried out by bringing hydrocarbons containing mercaptans into contact with said catalyst and oxidizing agent as defined in claim 1 in the presence of an aqueous alkaline solution, removing the resulting disulfides therefrom and recycling thus regenerated alkaline solution for reuse.

7. A process according to claim 1, further comprising preparing said member by reacting a salt of a metal selected from the group consisting of iron, cobalt, copper and molybdenum with pyromellitonitrile or a mixture of urea and a member selected from pyromellitic anhydride, pyromellitic acid and pyromellitic acid imide.

References Cited

UNITED STATES PATENTS

| | | | |
|---|---|---|---|
| 2,853,432 | 9/1958 | Glein et al. | 260—608X |
| 2,882,224 | 4/1959 | Glein et al. | 208—206 |
| 2,966,453 | 12/1960 | Glein et al. | 208—206 |
| 3,039,855 | 6/1962 | Urban | 260—608X |
| 3,108,081 | 10/1963 | Glein et al. | 208—206X |
| 3,130,148 | 4/1964 | Glein | 208—203X |
| 3,143,574 | 8/1964 | Brown | 260—608 |
| 3,148,137 | 9/1964 | Strong | 208—206 |
| 3,205,268 | 9/1965 | Rosenwald | 260—608 |

OTHER REFERENCES

Reid: "Chem. Bivalent Sulfur," vol. I (1958), pp. 118–119.

CHARLES B. PARKER, Primary Examiner

D. R. PHILLIPS, Assistant Examiner

U.S. Cl. X.R.

208—206, 207; 252—431